(12) United States Patent
Zeng et al.

(10) Patent No.: US 11,669,122 B2
(45) Date of Patent: Jun. 6, 2023

(54) SYNCHRONOUS JOYSTICK SENSOR, CONTROLLER, SYNCHRONOUS PROCESSING METHOD

(71) Applicant: GUANGDONG K-SILVER INDUSTRIAL CO., LTD., Shenzhen (CN)

(72) Inventors: Xiao Zeng, Shenzhen (CN); Jianbo Zhao, Shenzhen (CN)

(73) Assignee: GUANGDONG K-SILVER INDUSTRIAL CO., LTD., Shenzhen (CN)

( * ) Notice: Subject to any disclaimer, the term of this patent is extended or adjusted under 35 U.S.C. 154(b) by 0 days.

(21) Appl. No.: 17/547,272

(22) Filed: Dec. 10, 2021

(65) Prior Publication Data
US 2023/0090427 A1     Mar. 23, 2023

(30) Foreign Application Priority Data
Sep. 23, 2021   (CN) .......................... 202111117678.4

(51) Int. Cl.
*G05G 9/047*     (2006.01)
*G06F 3/0338*    (2013.01)

(52) U.S. Cl.
CPC ........... *G05G 9/047* (2013.01); *G06F 3/0338* (2013.01); *G05G 2009/04725* (2013.01); *G05G 2009/04748* (2013.01); *G05G 2009/04751* (2013.01); *G05G 2009/04755* (2013.01)

(58) Field of Classification Search
None
See application file for complete search history.

(56) References Cited

U.S. PATENT DOCUMENTS

| 10,528,074 | B1* | 1/2020 | Olsson | G06F 3/0338 |
| 11,385,672 | B1* | 7/2022 | Chu | G05G 25/00 |
| 2016/0334830 | A1* | 11/2016 | Sirohiwala | G05G 5/05 |

* cited by examiner

*Primary Examiner* — Duane N Taylor, Jr.

(57) ABSTRACT

A synchronous joystick sensor is provided, the synchronous joystick sensor includes a joystick, a joystick arm assembly, a swing detection assembly, a reset assembly. The joystick arm assembly is sleeved on the joystick, the arm assembly is driven by the joystick to swing in a first direction and a second direction perpendicular to the first direction. The swing detection assembly is configured to swing detection assembly, and configured to measure the swing amount in the first direction and the second direction through a magnetic detecting element, and convert the swing amount into a first electronic signal and a second electronic signal; a reset assembly configured to make the joystick being in a vertical reset state when there is no external force.

13 Claims, 9 Drawing Sheets

SYNCHRONOUS JOYSTICK SENSOR, CONTROLLER, SYNCHRONOUS PROCESSING METHOD

CROSS REFERENCE TO RELATED APPLICATION

This non-provisional patent application claims priority under 35 USC. § 119 from Chinese Patent Application No.202111117678.4 filed on Sep. 23, 2021, the entire content of which is incorporated herein by reference.

TECHNICAL FIELD

The disclosure relates to sensor technology, in particular to a synchronous joystick sensor, a controller, and a synchronous processing method.

BACKGROUND

Joystick sensors are commonly used in electronic products such as game controllers and consumer drone controllers. The joystick generally includes a joystick, a joystick arm that rotates according to the tilting operation of the joystick (containing upper joystick arm and a lower joystick arm arranged perpendicular to each other) and a variable resistance component that detects the amount of rotation of the joystick arm. The variable resistance component will output a corresponding output signal according to the amount of rotation of the joystick arm. At the same time, a reset component is provided under the joystick arm to ensure the joystick and joystick arm to reset automatically. The joystick sensor can be restored to a original state under the action of the reset component when the operation applied to the joystick is ended.

However, the above-mentioned variable resistance components usually use external force to move the brush on the carbon resistor to produce different resistance values on the circuit board. If a metal with greater elasticity is used as the brush, the brush wears quickly and has a short service life. If a metal with less elasticity is used as a brush, the problem of poor contact and failure between the brush and the carbon resistor is likely to occur. And if a high-hardness carbon resistor is used, the brush will wear out quickly and cause greater electronic noise. If a low-hardness carbon resistor is used, the carbon powder on the carbon resistor will be quickly worn off by the brush, and the carbon powder will stick to the brush, which affects the electronic performance of the brush and makes the potentiometer appear abnormal function. Therefore, the typical potentiometer generally has defects of short service life and poor performance.

In addition, the existing circuit boards are generally bulky and the reset assembly structure is complex, which leads to an increase in the gap between the joystick sensor components and the structure is not tight, which affects the direction operation experience of the joystick sensor, and also causes the joystick to swing and the rotation of the variable resistance components not be synchronized well, and the control accuracy is low.

Therefore, there is room for promotion in joystick sensor technology.

SUMMARY

In a first aspect, a synchronous joystick sensor is provided, the synchronous joystick sensor includes a joystick, a joystick arm assembly, a swing detection assembly, a reset assembly. The joystick arm assembly is sleeved on the joystick, the arm assembly is driven by the joystick to swing in a first direction and a second direction perpendicular to the first direction. The swing detection assembly is configured to measure swing amount in the first direction and the second direction through a magnetic detecting element, and convert the swing amount into a first electronic signal and a second electronic signal and output the first electronic signal and the second electronic signal; a reset assembly is configured to make the joystick being in a vertical reset state when there is no external force.

In a second aspect, a controller is provided, the controller includes a synchronous joystick sensor, the synchronous joystick sensor includes a joystick, a joystick arm assembly, a swing detection assembly, a reset assembly. The joystick arm assembly is sleeved on the joystick, the arm assembly is driven by the joystick to swing in a first direction and a second direction perpendicular to the first direction. The swing detection assembly is configured to measure swing amount in the first direction and the second direction through a magnetic detecting element, and convert the swing amount into a first electronic signal and a second electronic signal and output the first electronic signal and the second electronic signal; a reset assembly is configured to make the joystick being in a vertical reset state when there is no external force.

In a third aspect, a synchronization processing method for a synchronous joystick sensor is provided. The method includes steps of: determining whether an electronic signal set output by a piezoelectric ceramic assembly of the synchronous joystick sensor according is received when the set electronic signal is received, determining whether the first electronic signal output by the first magnetic induction element or the second electronic signal output by the second magnetic induction element is received while the electronic signal set is received; when the first electronic signal output by the first magnetic induction element or the second electronic signal output by the second magnetic induction element is received while the electronic signal set is received, determining the first electronic signal output by the first magnetic induction element or the second electronic signal output by the second magnetic induction element to be the detection output signal of the synchronous joystick sensor and output the detection output signal; when the first electronic signal output by the first magnetic induction element or the second electronic signal output by the second magnetic induction element is not received when the electronic signal set is received, the electronic signal set are input to a first trained neural network model to calculate a pushing force direction and a pushing force value of a pushing force acting on the joystick generating the electronic signal set correspondingly; determine the first electronic signal or the second electronic signal that needs to be supplemented according to the pushing force direction, and input the pushing force value into a second trained neural network model or a third trained neural network model to calculate the first electronic signal or the second electronic signal that needs to be supplemented output, and determining the first electronic signal or the second electronic signal that needs to be supplemented as the detection output signal of the synchronous joystick sensor and output the detection output signal; determine whether the first electronic signal output by the first magnetic induction element or the second electronic signal output by the second magnetic induction element is received; when the first electronic signal output by the first magnetic induction element or the second electronic signal output by the second magnetic induction element is received, determining the first electronic signal output by the first magnetic induction element or the second electronic signal output by the second magnetic induction element to be the detection output signal of the synchronous joystick sensor and output the detection output signal.

As described above, the synchronous rocker sensor, controller, and synchronous processing method of the embodiment of the present disclosure have the following advantages: 1. By replacing the existing variable resistance components with magnetic induction elements, the magnetic induction elements realize non-contact detection, thereby increasing the service life. 2. The first and second magnetic block are driven to rotate by the upper and lower rocker arms. The first and second magnetic blocks installed on the first and second magnetic block mounts and the first and second circuit boards. The second magnetic induction element cuts the magnetic lines of force, and outputs signals through the first and second terminals. By arranging the first and second detection components on one end of the pivots of the upper and lower rocker arms respectively, the circuit board and the magnetic induction element are integrated and installed in the outer cover of the circuit board, which reduces the size of the circuit board and greatly improves the degree of integration, and structural tightness is conducive to the miniaturization of the rocker sensor and the improvement of synchronization. 3. By using polyurethane elastic block, the honeycomb structure can withstand greater tension and has better elasticity, which improves the self-reset ability of the polyurethane elastic block and improves the reset sensitivity of the rocker sensor. By setting the concave hexagonal column, the shape of each side of the concave hexagon is relatively more stable, and the corners have the advantages of good flexibility, which can show an expansion effect when compressed, and has good compression resistance, which further improves the self-definition resilience of the polyurethane elastic block. 4. Through the tight connection between one end of the rocker, the polyurethane elastic block and the fixed base, the structure is stable and there is no gap between the structures, which improves the control synchronization and improves the control accuracy. 5. The pressure of the polyurethane elastic block is sensed synchronously by setting the piezoelectric ceramic component. Once the joystick is toggled, the polyurethane elastic block will be immediately stressed and compressed, and the piezoelectric ceramic component can detect the pressure condition of the polyurethane elasticity block immediately, and output a set of electrical signals as a synchronization judgment signal, which improves the synchronization.

BRIEF DESCRIPTION OF THE DRAWINGS

In order to illustrate the technical solution in the embodiments of the disclosure or the prior art more clearly, a brief description of drawings required in the embodiments or the prior art is given below. Obviously, the drawings described below are only some of the embodiments of the disclosure. For ordinary technicians in this field, other drawings can be obtained according to the structures shown in these drawings without any creative effort.

DETAILED DESCRIPTION OF THE EMBODIMENTS

Figure 1:
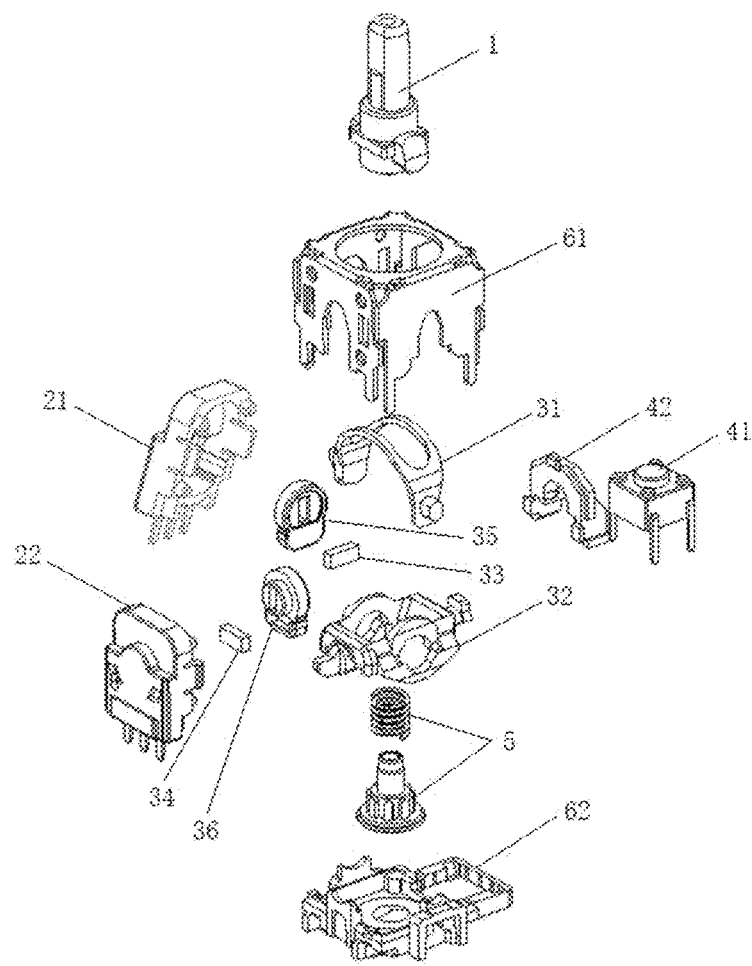
FIG. 1 illustrates an explosion view of an synchronous joystick sensor in accordance with a first embodiment.

The technical scheme of the disclosure will be clearly and completely described below in combination with the accompanying drawings. Obviously, the described embodiments are part of the embodiments of the disclosure, not all of them. Based on the embodiments of the disclosure, all other embodiments obtained by those skilled in the art without creative work belong to the protection scope of the disclosure.

In the description of the disclosure, it should be noted that the terms used herein are only for the purpose of describing specific embodiments and are not intended to limit the disclosure. The singular forms "one", "one" and "this" as used herein also include the plural unless expressly stated by the context. When the terms "include" and/or "include" are used, it is intended to indicate the existence of the feature, integer, step, operation, element and/or component, and does not exclude the existence or addition of one or more other features, integer, step, operation, element, component, and/or other combinations. The term "and/or" includes any and all combinations of one or more related listed items. The azimuth or positional relationship indicated by the terms "center", "up", "down", "left", "right", "vertical", "horizontal", "inside", "outside" is based on the azimuth or positional relationship shown in the attached drawings only for the convenience of describing the disclosure and simplifying the description, rather than indicating or implying that the device or element referred to must have a specific azimuth. It is constructed and operated in a specific orientation and therefore cannot be understood as a limitation of the present disclosure. The terms "first" and "second" are used only for descriptive purposes and cannot be understood as indicating or implying relative importance. The terms "installation", "connection" and "connection" shall be understood in a broad sense. For example, it can be fixed connection, removable connection or integrated connection. It can be directly connected, indirectly connected through an intermediate medium, or the connection between the two elements. For those skilled in the art, the specific meaning of the above terms in the disclosure can be understood in specific circumstances.

In addition, some diagrams in this specification are flow charts for illustrating methods. It should be understood that each block in these flowcharts and the combination of blocks in these flowcharts can be implemented by computer program instructions. These computer program instructions may be loaded onto a computer or other programmable device to form a machine so that the instructions executed on the computer or other programmable device form a structure for implementing the functions specified in the flowchart block. These computer program instructions may also be stored in a computer-readable memory, which may instruct a computer or other programmable device to work in a specific manner so that the instructions stored in the computer-readable memory form an article containing an instruction structure for implementing the functions specified in the flowchart block. The computer program instructions can also be loaded on a computer or other programmable device to perform a series of operation steps on the computer or other programmable device to form a process implemented by the computer, so that the instructions executed on the computer or other programmable device provide steps for implementing the functions specified in the flowchart block.

Accordingly, the blocks in each flowchart support a combination of structures for performing the specified function and a combination of steps for performing the specified function. It should also be understood that each block in the flowchart and the combination of blocks in the flowchart can be implemented by a special hardware based computer system performing the specified functions or steps, or a combination of special hardware and computer instructions.

In addition, the technical features involved in different embodiments of the disclosure described below can be combined with each other as long as they do not constitute a conflict with each other.

Embodiment 1

Referring to FIG. 1, this embodiment provides a synchronous joystick sensor including a joystick 1, a joystick arm assembly, and a swing detection assembly.

The joystick arm assembly is sleeved on the joystick 1, and the joystick 1 pushes the joystick arm assembly to swing in a first direction and a second direction perpendicular to each other.

The swing detection assembly is used to measure the swing amount in the first direction and the second direction through a magnetic induction element separately and convert them into a first electronic signal and a second electronic signal and output them By replacing the existing variable resistance component with a magnetic induction element, the magnetic induction element realizes non-contact detection, thereby increasing the service life.

Preferably, the joystick arm assembly includes an upper joystick arm 31, a lower joystick arm 32, a first magnetic block 33, a second magnetic block 34, a first magnetic block mounting seat 35, and a second magnetic block mounting seat 36.

The upper joystick arm 31 and the lower joystick arm 32 are respectively sleeved on the joystick 1, the joystick 1 pushes the upper joystick arm 31 to swing in the first direction, and the joystick 1 pushes the lower joystick arm 32 to swing in the second direction.

The first magnet block 33 is installed in the first magnet block mounting seat 35 and then hung at one end of a pivot of the upper joystick arm 31, and swings synchronously with the upper joystick arm 31. The second magnet block 34 is installed inside the second magnet block mounting seat 36 and then hung at one end of the pivot of the lower joystick arm 32 and swings synchronously with the lower joystick arm 32.

Preferably, the first magnetic block 33 and the second magnetic block 34 are in rectangular shaped.

Figure 2:
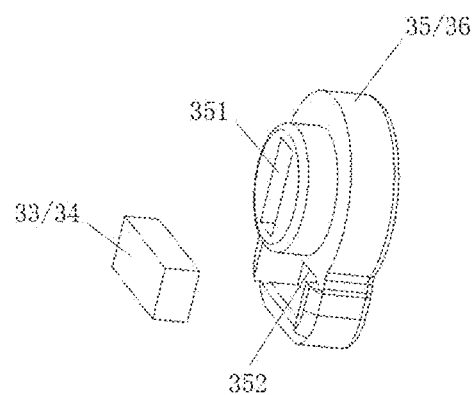
FIG. 2 illustrates a view of a first magnetic block mounting seat/a second magnetic block seat shown in the FIG. 1 in accordance with the first embodiment.

Preferably, as shown in FIG. 2, the first magnet block mounting base 35 and the second magnet block mounting base 36 both include a joystick arm connection socket 351 and a square slot 352.

The joystick arm connection socket 351 is configured to be inserted by one end of a pivot of the upper joystick arm 31 or a pivot of the lower joystick 32. The square slot 352 is defined under the joystick arm connection socket 351 to be inserted by the first magnetic block 33 or the second magnetic block 34.

Figure 3:
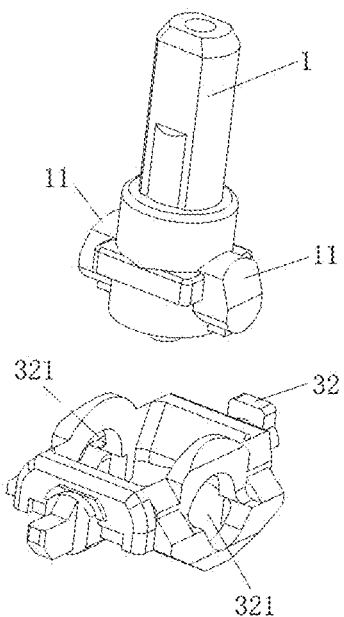
FIG. 3 illustrates a view of a lower joystick arm in accordance with the first embodiment.
Figure 4:
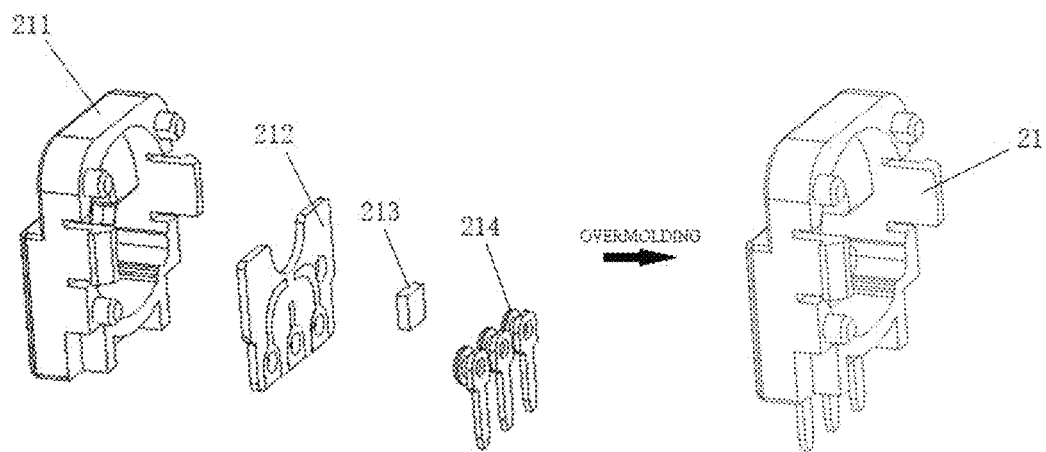
FIG. 4 illustrates a view of a first detection assembly in accordance with the first embodiment.
Figure 5:
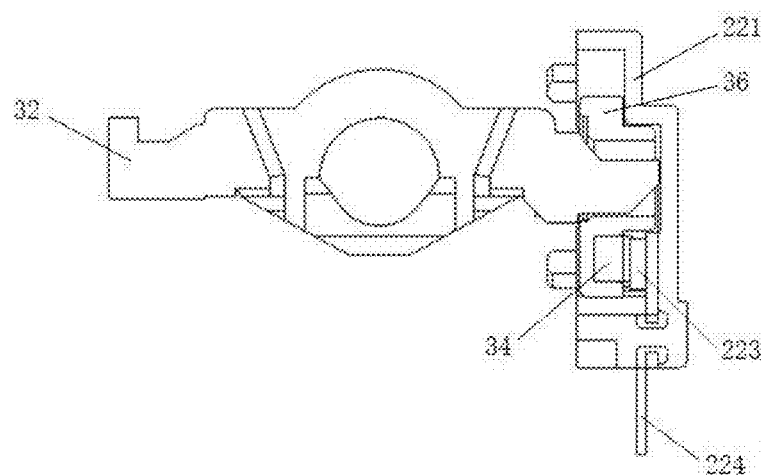
FIG. 5 illustrates a view of a second detection assembly to be installed in accordance with the first embodiment.
Figure 6:
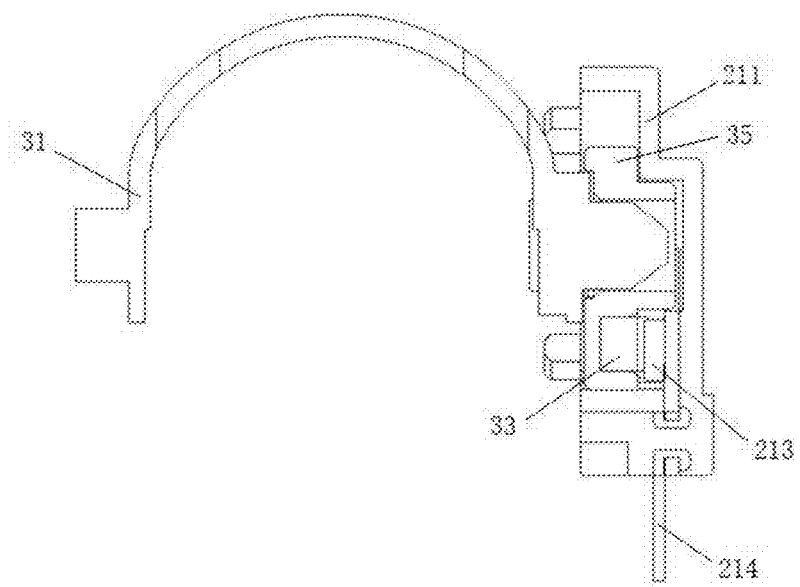
FIG. 6 illustrates a view of a first detection assembly to be installed in accordance with the first embodiment.

Preferably, as shown in FIG. 3, two sidewalls of the lower joystick arm 32 are respectively provided with sidewall holes 321.

Connecting stubs 11 are respectively installed on two axisymmetric sides of the lower bottom of the joystick 1, and the side wall holes 321 is configured to be inserted by the connecting stubs 11 to assemble and connect the joystick 1 and the lower joystick arm 32.

Preferably, as shown in FIGS. 1, 4-6, the swing detection assembly includes a first detection assembly 21 and a second detection assembly 22.

The first detection assembly 21 is installed near one end of the pivot of the upper joystick arm 31, and includes a first circuit board outer cover 211, a first circuit board 212 arranged in the first circuit board outer cover 211, a first magnetic induction element 213, and a first terminal 214. The first magnetic induction element 213 and the first terminal 214 are respectively connected to the first circuit board 212. The installation position of the first magnetic induction element 213 corresponds to the first magnetic block 33, and is used to generate first electronic signal corresponding to the swing of the first magnetic block 33 in and output the first electronic signal. The first terminal 214 is used as a first electronic signal lead-out line and can be connected to other circuit boards.

The second detection assembly 22 is installed near one end of the pivot of the lower joystick arm 32, and has the same structure as the first detection assembly 21, such as the second detection assembly 22 including a second circuit board outer cover 221, and a second circuit board, a second magnetic induction element 223, and the second terminal 224 arranged inside the second circuit board outer cover 221. The second magnetic induction element 223 and the second terminal 224 are respectively connected to the second circuit board. The installation position of the second magnetic induction element 223 corresponds to the second magnetic block 34, and is used to generate a second electronic signal corresponding to the swing of the magnetic block 34 in the second direction and output the second electronic signal. The second terminal 224 is used as a second electronic signal lead-out line and can be connected to other circuit boards. The upper and lower joystick arms drive the first and second magnet block to rotate. A magnetic line of the first and second magnet blocks installed on the first and second magnet block, and a magnetic line of the first and second magnetic blocks installed in the first and second circuit boards are cut. and signals are output through the first and second terminals. The first detection assembly and second detection assembly are arranged on the end of the pivot of the upper arm and the end of the pivot of lower joystick arm respectively that the circuit board and the magnetic induction element are integrated and installed in the outer cover of the circuit board, which reduces the size of the circuit board, and greatly improves the degree of integration and structural tightness, as a result, it is conducive to the miniaturization of the joystick sensor and the improvement of synchronization.

Preferably, the first circuit board 212, the first magnetic induction element 213 and the first terminal 214 are installed in the outer cover 211 of the first circuit board and then subjected to overmolding treatment that the second circuit board, the second magnetic induction element and the second terminal are installed on the outer cover of the second circuit board is plasticized and re-encapsulated, and make the second circuit board, the second magnetic induction element and the second terminal be much safer.

Preferably, the first magnetic induction element and the second magnetic induction element are both linear Hall elements.

Preferably, the first circuit board outer cover 211 is covered on the first magnetic block mounting base 35, and the second circuit board outer cover 221 is covered on the second magnetic block mounting base 36, which has the advantages of compact structure and miniaturization.

Figure 7:
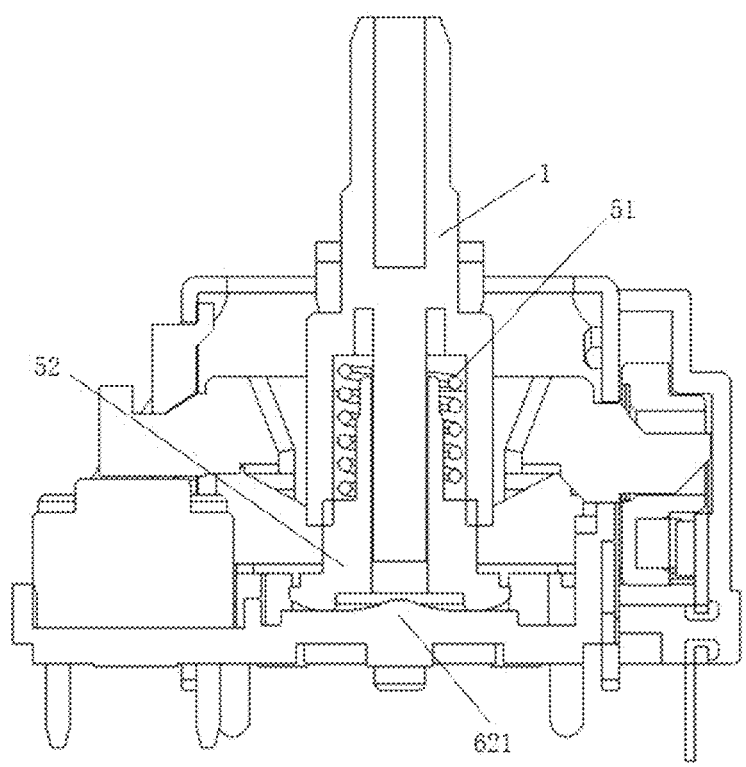
FIG. 7 illustrates cross-section view of a reset assembly in accordance with the first embodiment.

Preferably, as shown in FIGS. 1 and 7, the synchronous joystick sensor further includes a reset assembly 5, an upper shell 61 and a lower shell 62; the upper shell 61 and the lower shell 62 are connected to form an encapsulation shell of the synchronous joystick sensor; and the lower shell 62 has a protrusion 621 on the inner surface.

The reset assembly 5 includes a spring 51 and a sliding seat 52. The sliding seat 52 is a hollow cylinder containing a upper hollow cylinder with a small diameter and a lower hollow cylinder with a large diameter. The spring 51 is sleeved on the upper hollow cylinder of the sliding seat 52 and then inserted into the lower part of the joystick 1 with a core column in the circular hollow column, the core column at the lower part of the joystick 1 is inserted into the hollow column of the sliding seat 51. The sliding seat 52 is placed on the lower shell 62, and the bottom surface of the sliding seat 52 has an inner concave portion, which is connected with the protrusion 621 of the lower shell 62. The protrusion 621 is engaged to the concave portion when the joystick 1 is at rest, the protrusion 621 is just located in the concave portion of the sliding seat, which can keep the joystick 1 upright. When the joystick is swung, the sliding seat is squeezed by the protrusion 621 and moves toward the inside of the joystick 1, and the spring 51 is compressed. When the joystick 1 is released, the spring 51 to release elastic force and push the sliding seat 52 to move to the outside of the joystick 1 until it stops when the slide seat is in an upright state. At this time, the joystick 1 returns to the upright state. The plug-in structure among the joystick, the spring and the sliding seat, the compactness of the structure is improved, the miniaturization is realized, and the automatic reset can be sensitively.

Preferably, the synchronous joystick sensor further includes a switch 41 and a switch mounting base 42, the switch 41 is mounted on the switch mounting base 42, and the switch mounting base 42 is connected to the lower shell 62. The switch is configured to provide switch control signals.

Example 2

Figure 8:
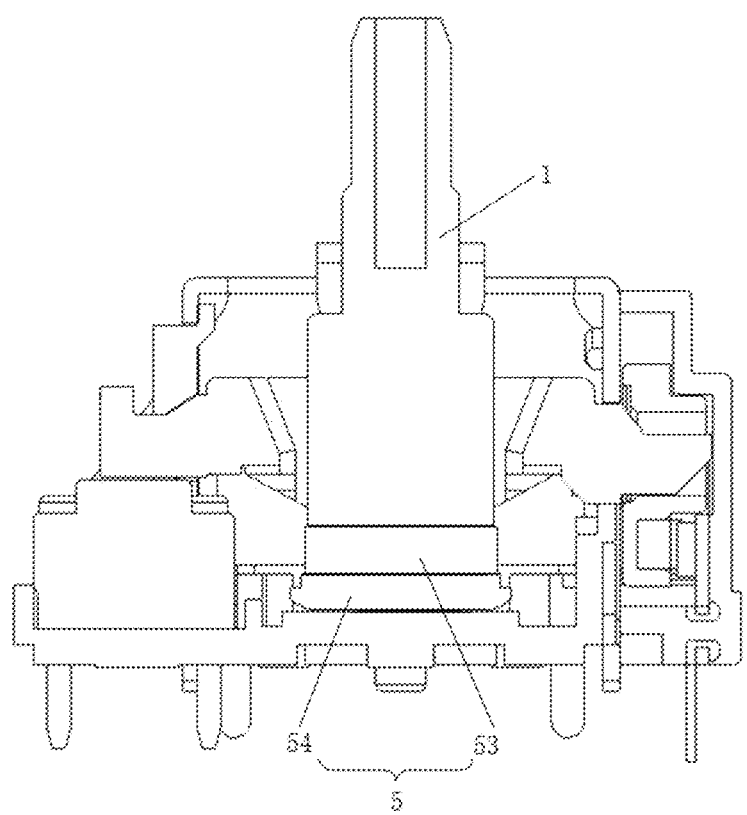
FIG. 8 illustrates a cross-section view of the synchronous joystick sensor in a upright status in accordance with a second embodiment.
Figure 9:
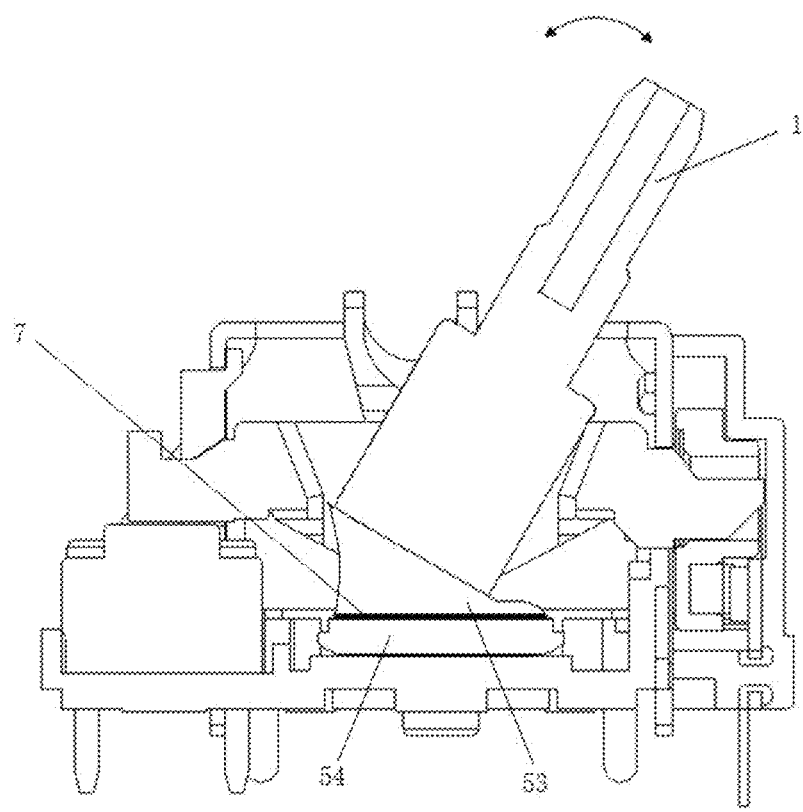
FIG. 9 illustrate a cross-section view of the synchronous joystick sensor in a tilt status under a force in accordance with the second embodiment .

This embodiment provides a synchronous joystick sensor. As shown in FIGS. 8 and 9, the difference from embodiment 1 is that the reset assembly 5 includes a polyurethane elastic block 53 and a fixed base 54. One end of the joystick 1 is connected to the polyurethane elastic block 53. The upper surface of polyurethane elastic block 53 is tightly connected, the polyurethane elastic block 53 is installed on the fixed base 54 via the bottom surface, and the fixed base 54 is connected with the inner surface of the lower shell 61. When a propulsive force applied on the joystick 1 is released, the joystick 1 automatically restore the upright state under an elastic force of polyurethane elastic block 53.

The synchronous joystick sensor described above uses a polyurethane elastic block to improve the self-reset capability of the reset assembly and improve the reset sensitivity of the joystick sensor. The tightly connection among one end of the joystick and the polyurethane elastic block, and the fixed base, the structure of synchronous joystick sensor is stable, and there is no gap between the assemblies, which improves the control synchronization and the control accuracy.

Preferably, the synchronous joystick sensor further includes a piezoelectric ceramic component 7, which is installed between the bottom surface of the polyurethane elastic block 53 and the fixed base 54 for converting the pressure transmitted from the polyurethane elastic block 53 into an electronic signal set including the magnitude and direction of the pressure and output the electronic signal set.

The above-mentioned synchronous joystick sensor detects the force of the polyurethane elastic block by setting the piezoelectric ceramic component. Once the joystick is moved, the polyurethane elastic block will be immediately stressed and compressed, and the piezoelectric ceramic component will be ready for detecting the compression of the polyurethane elastic block immediately, and the electronic signal set is output as a synchronization judgment signal, which improves the synchronization.

Figure 10:
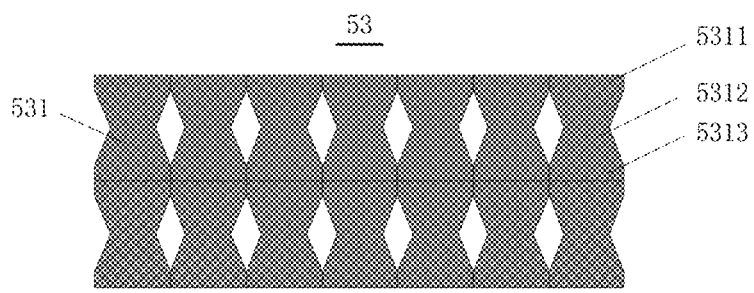
FIG. 10 illustrates a view of a polyurethane elastic block in accordance with the second embodiment.
Figure 11:
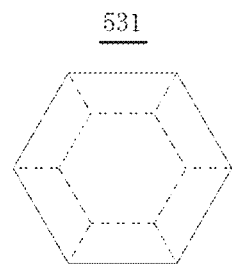
FIG. 11 illustrates a view of an inner concave pillars in accordance with the second embodiment.

Preferably, the polyurethane elastic block 53 is made of a polyurethane material. As shown in FIGS. 10 and 11, the polyurethane elastic block 53 includes one or more honeycomb structure layers. The honeycomb structure layer includes inner concave pillars 531 connected in a regular arrangement. The concave cylinder 531 includes an upper cylinder 5311, a concave hexagonal cylinder 5312, and a lower cylinder 5313 that are sequentially connected, and the upper cylinder 5311, the concave hexagonal cylinder 5312, and the lower cylinder 5313 are coaxially arranged. The cross-sections of the upper cylinder 5311, the concave hexagonal cylinder 5312, and the lower cylinder 5313 are all hexagons. The honeycomb structure can withstand greater tension and pressure, the elasticity is better, and the self-healing ability of the polyurethane elastic block is improved. By setting the concave hexagonal column, the shape of each side of the concave hexagon is relatively more stable, and the corners have the advantages of good flexibility, which can show an expansion effect when compressed, and has good compression resistance, which further improves the self-definition resilience of the polyurethane elastic block.

Figure 12:
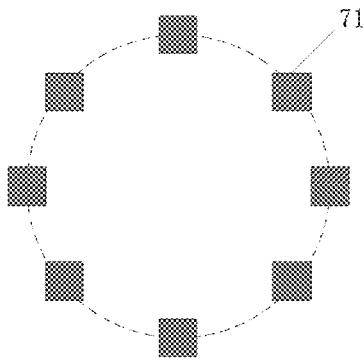
FIG. 12 illustrates a view of a piezoelectric ceramic assembly in accordance with the second embodiment.

Preferably, as shown in FIG. 12, the piezoelectric ceramic component 7 is composed of a plurality of piezoelectric ceramic elements 71 uniformly arranged in a circle, and the electronic signal output by each piezoelectric ceramic element 71 constitutes the electronic signal set. According to the different electronic signals output by each piezoelectric ceramic element, the magnitude and direction of the pressure received can be obtained, and the swing direction of the joystick and the magnitude of the pushing force received can be obtained, as a result, it improves the detection accuracy. Preferably, the number of piezoelectric ceramic elements is at least three.

Example 3

This embodiment provides a controller, including the synchronous joystick sensor of Embodiment 1 or Embodiment 2, which has the advantages of long service life, miniaturization, good synchronization, and automatic reset sensitivity.

Example 4

Figure 13:
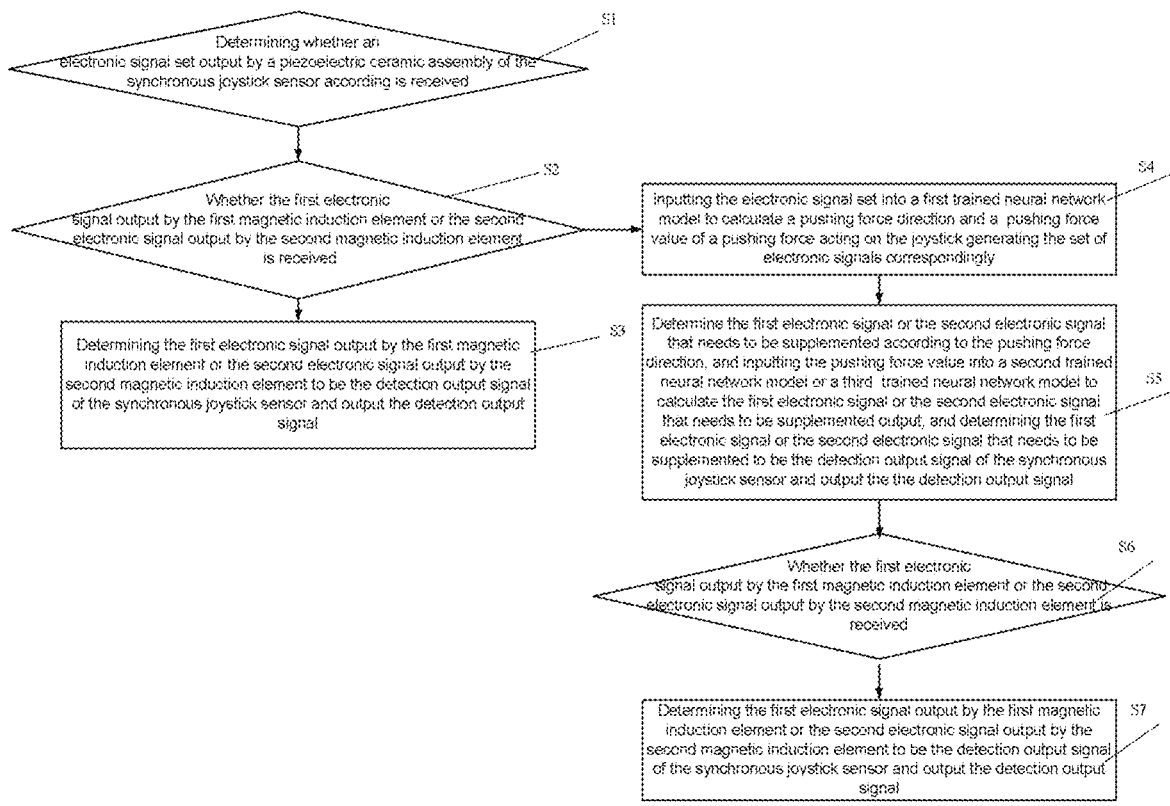
FIG. 13 illustrates a flow diagram of a synchronization processing method in accordance with an embodiment.

This embodiment provides a synchronization processing method for a synchronized joystick sensor, as shown in FIG. 13, including the following steps.

In step S1, determining whether the electronic signal set output by the piezoelectric ceramic component 7 of the synchronous joystick sensor in Embodiment 2 is received; when it is not received, it means that the joystick is not pushed, and the joystick is in an upright state, and maintaining an upright state.

In step S2, when the electronic signal set is received, determining whether the first electronic signal output by the first magnetic induction element 213 or the second electronic signal output by the second magnetic induction element 223 is received while the electronic signal set is received.

In step S3, when the first electronic signal output by the first magnetic induction element 213 or the second electronic signal output by the second magnetic induction element 223 is received at the same time as the electronic signal set is received, determining the first electronic signal output by the first magnetic induction element 213 or the second electronic signal output by the second magnetic induction element 223 to be the detection output signal of the synchronous joystick sensor and output the detection output signal. In detail, when the first electronic signal output by the first magnetic induction element 213 or the second electronic signal output by the second magnetic induction element 223 is received at the same time as the electronic signal set is received, it indicates that the swing of the joystick and the magnetic induction element is sensed and the swing has synchronization, so no correction is needed. The first electronic signal output by the first magnetic induction element 213 or the second electronic signal output by the second magnetic induction element 223 is used as the detection output signal of the synchronous joystick sensor and output.

In step S4 when the first electric signal output by the first magnetic induction element 213 or the second electric signal output by the second magnetic induction element 223 is not received when the electric signal set is received, the electronic signal set is input to a first trained neural network model to calculate a pushing force direction and a pushing force value of a pushing force acting on the joystick 1 corresponding to the electronic signal set; the input of the first neural network model is the electronic signal set, the output is the direction and value of the pushing force acting on the joystick 1 corresponding to the electronic signal set. Preferably, the first neural network model is a basis function neural network model (BF) neural network model, an radial basis function neural network model (RBF) neural network model, and the like. It is understood that, when the first electric signal output by the first magnetic induction element 213 or the second electric signal output by the second magnetic induction element 223 is not received while the electric signal set is received, it means that the magnetic induction element starts to swing when the joystick is forced to swing, if the swing is not sensed for immediately, it is possible that the sensing of the magnetic induction element has a lag, and there is no synchronization. When the magnetic induction element output the electronic signals, the joystick has already swung a certain angle, so it needs to be corrected at this time.

In step S5, determining the first electronic signal or the second electronic signal that needs to be supplemented according to the pushing force direction, and input the pushing force value into a second trained neural network model or a third trained neural network model to calculate the first electronic signal or the second electronic signal that needs to be supplemented output, the first electronic signal or the second electronic signal that needs to be supplemented output is used as the detection output signal of the synchronous joystick sensor and output; the input of the second neural network model is the pushing force value, and the output is the first electronic signal that needs to be supplemented; the input of the third neural network model is the pushing force value, and the output is the second electronic signal that needs to be supplemented. That is to say, there is first determined whether the swing direction of the joystick is the first direction or the second direction according to the pushing force direction, if it is the first direction, there is then input the pushing force value into the second neural network model, and output the first electronic signal that needs to be supplemented. If it is the second direction, the pushing force value is input to the trained third neural network model, and the second electronic signal that needs to be supplemented is output. Preferably, the second neural network model and the third neural network model are BF neural network models, RBF neural network models, and the like.

In the step S6, determining whether the first electronic signal output by the first magnetic induction element 213 or the second electronic signal output by the second magnetic induction element 223 is received. When the first electronic signal output by the first magnetic induction element 213 or the second electronic signal output by the second magnetic induction element 223 is not received, it means that it is still in the hysteresis stage, maintain the current status, and continue to use the first electronic signal or the second electronic signal need to be supplemented as the detection output signal of the synchronous joystick sensor and output the first electronic signal or the second electronic signal need to be supplemented.

In the step S7, when the first electronic signal output by the first magnetic induction element 213 or the second electronic signal output by the second magnetic induction element 223 is received, the first electronic signal output by the first magnetic induction element 213 or the second magnetic induction element 223 is used as the detection output signal of the synchronous joystick sensor and output, so as to replace the first electronic signal or the second electronic signal need to be supplementary output by the synchronous joystick sensor when the first magnetic induction element 213 or the second electronic signal output by the second magnetic induction element 223 is not received. The signal actually detected by the first or second magnetic induction element is used as the output to end the hysteresis correction process, because the signal predicted by the neural network is used to as the output signal of the synchronous joystick sensor during the lag time, the blank output of the lag process is filled, and the synchronization is improved.

Figure 17:
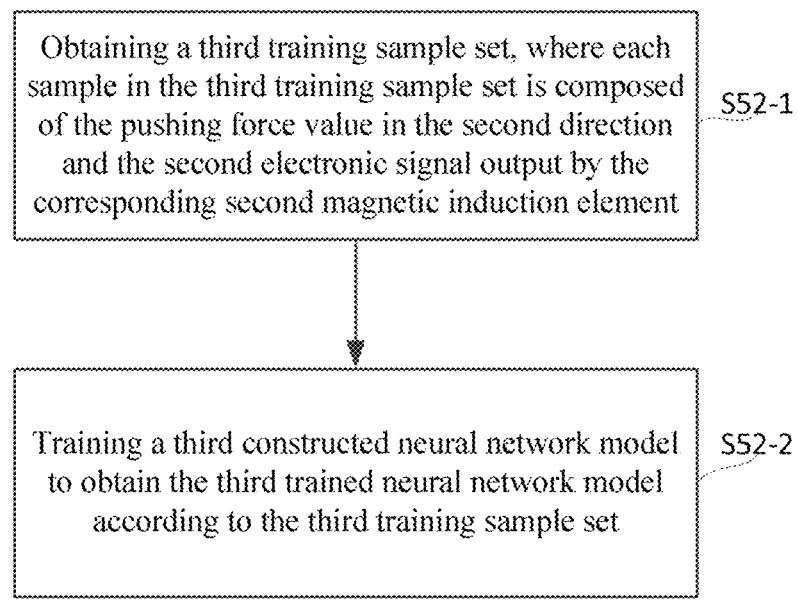
FIG. 17 illustrates a sub-flow diagram of the step of training a third neural network model.

Refering to FIG. 17, preferably, the step of training the first neural network model includes:

In step S41, obtaining a first training sample set, each sample in the first training sample set consists of a pushing force direction and pushing force value acting on the joystick, and the electronic signal set output by the corresponding piezoelectric ceramic component.

In step S42, training the first neural network model constructed to obtain the first trained neural network model according to the first training sample set. In deteail, the electronic signal set output by the piezoelectric ceramic components is used as the input of a constructed first neural network model, and the corresponding pushing force direction and pushing force value acting on the joystick is used as the output of the first constructed neural network model, and the value of each structure parameter of a neural network model is obtained, so as to obtain a first trained neural network model.

Figure 16:
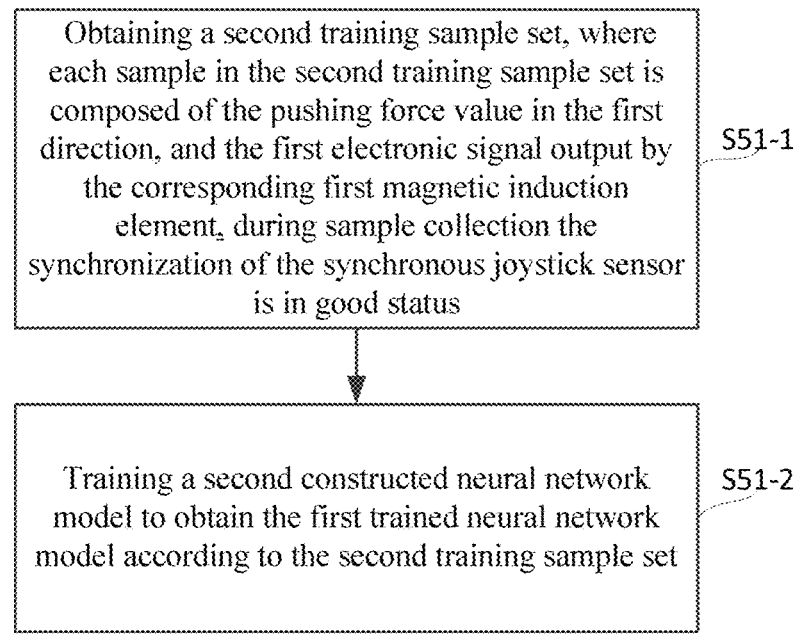
FIG. 16 illustrates a sub-flow diagram of the step of training a second neural network model includes.

Refering to FIG. 16, preferably, the step of training the second neural network model includes the following steps.

In step S51-1, obtaining a second training sample set, where each sample in the second training sample set is composed of the pushing force value in the first direction, and the first electronic signal output by the corresponding first magnetic induction element 213, during sample collection the synchronization of the synchronous joystick sensor is in good status.

In step S51-2, training a second constructed neural network model to obtain the first trained neural network model according to the second training sample set. In detail, the pushing force value is used as the input of the constructed second neural network model, and corresponding to the first electronic signal is used as the output, training the second neural network model to obtain various structural parameter values of the second neural network model in order to obtain the second trained neural network model.

Refering to FIG. 17, preferably, the step of training the third neural network model includes:

In S52-1. obtaining a third training sample set, where each sample in the third training sample set is composed of the pushing force value in the second direction and the second electronic signal output by the corresponding second magnetic induction element 223. During sample collection, the synchronization of the synchronous joystick sensor is in a good status.

In S52-2, training a third constructed neural network model to obtain the third trained neural network model according to the third training sample set. In detail, the pushing force value is used as the input of the constructed third neural network model, and corresponding to the second electronic signal is used as the output, training the third neural network model to obtain various structural parameter values of the third neural network model, thereby, a trained third neural network model is obtained.

Example 5

Figure 14:
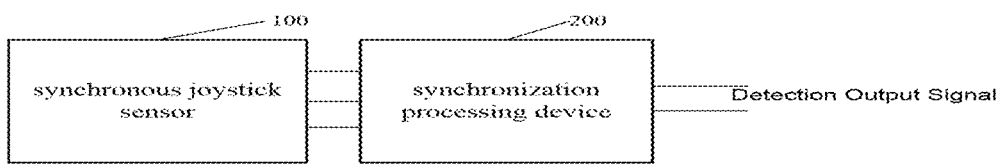
FIG. 14 illustrates diagram view of a synchronization processing system in accordance with an embodiment.
Figure 15:
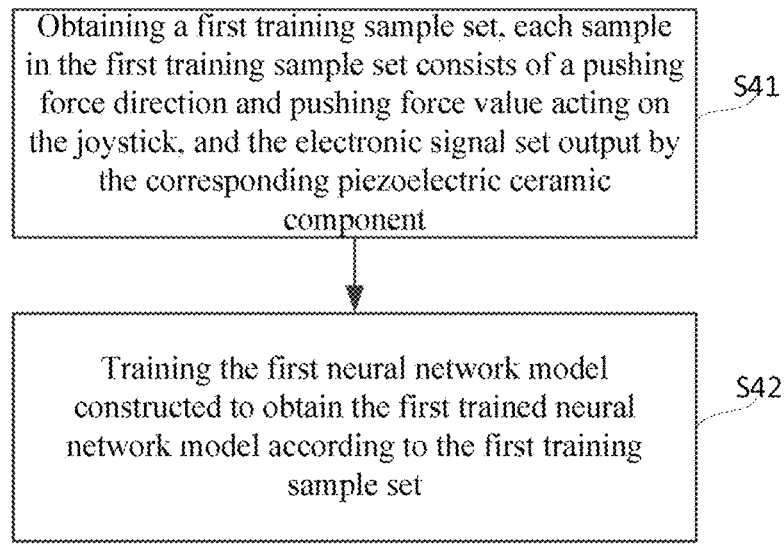
FIG. 15 illustrates a sub-flow diagram of the step of training a first neural network model.

This embodiment provides a synchronization processing system for a synchronized joystick sensor, as shown in FIG. 14, including the synchronized joystick sensor 100 and the synchronization processing device 200 of Embodiment 2.

The synchronization processing device includes one or more processors; and and one or more memories for storing one or more programs;

When the one or more programs are executed by the one or more processors, the one or more processors are caused to implement the synchronization processing method of Embodiment 4.

Obviously, the above embodiments are merely examples for clear description, and are not intended to limit the implementation manners. For those of ordinary skill in the art, other changes or changes in different forms can be made on the basis of the above description. It is unnecessary and impossible to list all the implementation methods here. The obvious changes or changes derived from this are still within the protection scope created by the present disclosure.

The invention claimed is:

1. A synchronous joystick sensor comprising
a joystick;
a joystick arm assembly, sleeved on the joystick, and the joystick arm assembly being driven by the joystick, to swing in a first direction and a second direction perpendicular to the first direction;
a swing detection assembly, configured to measure the swing amount in the first direction and the second direction through a magnetic detecting element, and convert the swing amount into a first electronic signal and a second electronic signal and output the first electronic signal and the second electronic signal;
a reset assembly, configured to make the joystick being in a vertical reset state when there is no external force;
wherein the upper joystick arm and the lower joystick arm are respectively sleeved on the joystick, the joystick pushes the upper joystick arm to swing in the first direction, and the joystick pushes the lower joystick arm to swing in the second direction;
the first magnetic block is installed in the first magnetic block mounting seat and then hung on one end of a pivot of the upper joystick, and swings synchronously with the upper joystick arm; the second magnetic block is installed in the second magnetic block mounting seat and then hung on one end of a pivot of the lower joystick, and swings synchronously with the lower joystick arm.

2. The synchronized joystick sensor according to claim 1, wherein the swing detection assembly comprises a first detection assembly and a second detection assembly;
the first detection assembly is installed near one end of the pivot of the upper joystick, and comprises a first circuit board outer cover, a first circuit board, a first magnetic induction element, and a first terminal, the first circuit board, the first magnetic induction element, and the first terminal are arranged in the first circuit board outer cover; the first magnetic induction element and the first terminal are respectively connected to the first circuit board; an installation position of the first magnetic induction element corresponds to the first magnetic block, and is configured to generate and output the first electronic signal corresponding to the swing of the first magnetic block in the first direction; the first terminal is used as lead-out line for the first electronic signal;
the second detection assembly is installed near one end of the pivot of the lower joystick, and comprises a second circuit board outer cover, a second circuit board, a second magnetic induction element, and a second terminal; the second circuit board, the second magnetic induction element, and the second terminal are respectively connected to the second circuit board; an installation position of the second magnetic induction element corresponds to the second magnetic block, and is used to generate and output a second electronic signal corresponding to the swing of the second magnetic block in the second direction, the second terminal is used as lead-out line for the second electronic signal.

3. The synchronous joystick sensor according to claim 2, wherein the first circuit board, the first magnetic induction element and the first terminal are installed in the outer cover of the first circuit board and then are overmolded, the second circuit board, the second magnetic induction element and the second terminal are installed in the outer cover of the second circuit board and then are overmolded.

4. The synchronous joystick sensor according to claim 3, wherein the reset assembly comprises a spring and a sliding seat, the sliding seat is a hollow cylinder containing a upper hollow cylinder with a small diameter and a lower hollow cylinder with a large diameter, and the spring is sleeved on the upper hollow cylinder and then is put into a circular hollow column with a core column at the lower part of the joystick, and the core column at the lower part of the joystick is inserted into the hollow cylinder of the sliding seat; the synchronous joystick sensor also includes an upper shell and a lower shell; the upper shell and the lower shell are connected to form a package shell for the synchronous joystick sensor; the inner surface of the lower shell has a protrusion; the sliding seat is placed on the lower shell, and the bottom surface of the sliding seat facing the inner surface has an concave portion, and the concave portion is engaged with the protrusion.

5. The synchronous joystick sensor according to claim 3, wherein the reset assembly comprises a polyurethane elastic block and a fixed base; one end of the joystick is tightly connected with the upper surface of the polyurethane elastic block, and the polyurethane elastic block is installed on the fixed base with a bottom surface of the polyurethane elastic block, and the fixed base is connected with the inner surface of the lower shell; the joystick with the pushing force removed is automatically restored to an upright state under the self-restoring force of the polyurethane elastic block.

6. The synchronous joystick sensor according to claim 5, further comprising: a piezoelectric ceramic assembly; the piezoelectric ceramic assembly is installed between a bottom surface of the polyurethane elastic block and the fixed base, and configured to convert a pressure transmitted from the polyurethane elastic block into an electronic signal set including magnitude and direction of the pressure, and output the electronic signal set.

7. A controller, comprising a synchronous joystick sensor, the synchronous joystick sensor comprising
a joystick,
a joystick arm assembly, sleeved on the joystick, and the joystick, arm assembly being driven by the joystick, to swing in a first direction and a second direction perpendicular to the first direction;
a swing detection assembly, configured to measure the swing amount in the first direction and the second direction through a magnetic detecting element, and convert the swing amount into a first electronic signal and a second electronic signal and output the first electronic signal and the second electronic signal;
a reset assembly, configured to make the joystick being in a vertical reset state when there is no external force;
wherein the joystick arm assembly comprises an upper joystick arm, a lower joystick arm, a first magnetic block, a second magnetic block, a first magnetic block mounting seat, and a second magnetic block;

the upper joystick arm and the lower joystick arm are respectively sleeved on the joystick, the joystick pushes the upper joystick arm to swing in the first direction, and the joystick pushes the lower joystick arm to swing in the second direction;
the first magnetic block is installed in the first magnetic block mounting seat and then hung on one end of a pivot of the upper joystick, and swings synchronously with the upper joystick arm; the second magnetic block is installed in the second magnetic block mounting seat and then hung on one end of a pivot of the lower joystick and swings synchronously with the lower joystick arm.

8. The controller according to claim 7, wherein the swing detection assembly comprises a first detection assembly and a second detection assembly;
the first detection assembly is installed near one end of the pivot of the upper joystick, and comprises a first circuit board outer cover, and a first circuit board, a first magnetic induction element, and a first terminal arranged in the first circuit board outer cover; the first magnetic induction element and the first terminal are respectively connected to the first circuit board; the installation position of the first magnetic induction element corresponds to the first magnetic block, and is configured to generate and output the first electronic signal corresponding to the swing of the first magnetic block in the first direction; the first terminal is used as lead-out line for the first electronic signal;
the second detection assembly is installed near one end of the pivot of the lower joystick, and comprises a second circuit board outer cover, a second circuit board arranged in the second circuit board outer cover, a second magnetic induction element, and a second terminal; the second magnetic induction element and the second terminal are respectively connected to the second circuit board; the installation position of the second magnetic induction element corresponds to the second magnetic block, and is used to generate and output a second electronic signal corresponding to the swing of the second magnetic block in the second direction, the second terminal is used as lead-out line for the second electronic signal.

9. The controller according to claim 8, wherein the first circuit board, the first magnetic induction element and the first terminal are installed in the outer cover of the first circuit board and then are overmolded, the second circuit board, the second magnetic induction element and the second terminal are installed in the outer cover of the second circuit board and then then are overmolded.

10. The controller according to claim 9, wherein the reset assembly comprises a spring and a sliding seat, the sliding seat is a hollow cylinder containing a upper hollow cylinder with a small diameter and a lower hollow cylinder with a large diameter, and the spring is sleeved on the upper hollow cylinder and then is put into a circular hollow column with a core column at the lower part of the joystick, and the core column at the lower part of the joystick is inserted into the hollow cylinder of the sliding seat; the synchronous joystick sensor also includes an upper shell and a lower shell; the upper shell and the lower shell are connected to form a package shell for the synchronous joystick sensor; the inner surface of the lower shell has a protrusion; the sliding seat is placed on the lower shell, and the bottom surface of the sliding seat facing the inner surface has an concave portion, and the concave portion is engaged with the protrusion.

11. The controller according to claim 10, wherein the reset assembly comprises a polyurethane elastic block and a fixed base; one end of the joystick is tightly connected with the upper surface of the polyurethane elastic block, and the polyurethane elastic block is installed on the fixed base with a bottom surface of the polyurethane elastic block, and the fixed base is connected with the inner surface of the lower shell; the joystick with the pushing force removed is automatically restored to an upright state under the self-restoring force of the polyurethane elastic block.

12. The controller according to claim 11, further comprising a piezoelectric ceramic assembly; the piezoelectric ceramic assembly is installed between the bottom surface of the polyurethane elastic block and the fixed base, and configured to convert a pressure transmitted from the polyurethane elastic block into an electronic signal set including magnitude and direction of the pressure and the set of the output the electronic signal.

13. A synchronization processing method for a synchronous joystick sensor, the synchronous joystick sensor a joystick, a joystick arm assembly, sleeved on the joystick, and the joystick, arm assembly being driving by the joystick, to swing in a first direction and a second direction perpendicular to the first direction; a swing detection assembly, configured to measure the swing amount in the first direction and the second direction through a magnetic detecting element, and convert the swing amount into a first electronic signal and a second electronic signal; a reset assembly configured to make the joystick being in a vertical reset state when there is no external force, the method comprises:

determining whether an electronic signal set output by a piezoelectric ceramic assembly of the synchronous joystick sensor according is received;

when the set electronic signal is received, determining whether the first electronic signal output by the first magnetic induction element or the second electronic signal output by the second magnetic induction element is received while the electronic signal set is received;

when the first electronic signal output by the first magnetic induction element or the second electronic signal output by the second magnetic induction element is received while the electronic signal set is received, determining the first electronic signal output by the first magnetic induction element or the second electronic signal output by the second magnetic induction element to be the detection output signal of the synchronous joystick sensor and output the detection output signal;

when the first electronic signal output by the first magnetic induction element or the second electronic signal output by the second magnetic induction element is not received when the electronic signal set is received, inputting the electronic signal set into a first trained neural network model to calculate a pushing force direction and a pushing force value of a pushing force acting on the joystick generating the electronic signal set correspondingly;

determine the first electronic signal or the second electronic signal that needs to be supplemented according to the pushing force direction, and input the pushing force value into a second trained neural network model or a third trained neural network model to calculate the first electronic signal or the second electronic signal that needs to be supplemented output, and determining the first electronic signal or the second electronic signal that needs to be supplemented as the detection output signal of the synchronous joystick sensor and output the detection output signal;

determine whether the first electronic signal output by the first magnetic induction element or the second electronic signal output by the second magnetic induction element is received;

when the first electronic signal output by the first magnetic induction element or the second electronic signal output by the second magnetic induction element is received, determining the first electronic signal output by the first magnetic induction element or the second electronic signal output by the second magnetic induction element to be the detection output signal of the synchronous joystick sensor and output the detection output signal.

* * * * *